United States Patent [19]

Hine, Jr. et al.

[11] 4,262,829

[45] Apr. 21, 1981

[54] BICYCLE PACK AND METHOD OF ATTACHMENT

[75] Inventors: Edward K. Hine, Jr., Louisville; Gregory S. Hine, Boulder, both of Colo.

[73] Assignee: Hine-Snowbridge, Inc., Boulder, Colo.

[21] Appl. No.: 90,947

[22] Filed: Nov. 5, 1979

[51] Int. Cl.³ ............................................. B62J 9/00
[52] U.S. Cl. ............................. 224/32 R; 224/32 A
[58] Field of Search .................. 224/30 R, 31, 32 R, 224/32 A, 39; 190/60

[56] References Cited

U.S. PATENT DOCUMENTS

| | | | |
|---|---|---|---|
| 3,786,972 | 1/1974 | Alley | 224/31 |
| 3,937,374 | 2/1976 | Hine, Jr. | 224/32 A |
| 4,174,795 | 11/1979 | Jackson et al. | 224/32 A |

FOREIGN PATENT DOCUMENTS

| | | | |
|---|---|---|---|
| 231632 | 3/1944 | Switzerland | 224/32 A |
| 446331 | 4/1936 | United Kingdom | 224/32 A |

*Primary Examiner*—Steven M. Pollard
*Attorney, Agent, or Firm*—O'Rourke & Harris

[57] ABSTRACT

A bicycle pack, such as a pannier bag, adapted to be releasably secured between spaced, fixed positions on a bicycle, such as to a bicycle carrier, the pack including fasteners thereon for engagement with one of the bicycle attachment positions, and, at the spaced position on the pack, resilient members secured to the pack and adapted to engage the other of the mounting positions on the bicycle. The pack is constructed of pliable material and includes a pair of spaced rigid members positioned at the two attachment positions of the pack with each rigid member extending substantially transversely to the direction in which tension is induced by the resilient member when attached to the bicycle, whereby, the pack may be compactly compressed, and "stuffed" into another pack for transport apart from the bicycle, while still maintaining the ability to be attached to the bicycle and provide a wrinkle free, functionally rigid wall member of pliable material between the two spaced rigid members.

11 Claims, 3 Drawing Figures

BICYCLE PACK AND METHOD OF ATTACHMENT

The present invention relates generally to bicycle packs, and more particularly to an improved "stuffable" bicycle pack, such as a pannier bag which functions as a rigid pack wall between the attachment points when secured to a bicycle, but which is inherently pliable in such direction when removed from the bicycle.

DESCRIPTION OF THE PRIOR ART

Bicycle packs, such as pannier bags, are commonly attached to the rear carrier of a bicycle, or at some other location presenting spaced, substantially fixed attachment points. Typical of such previous embodiments is that described in U.S. Pat. No. 3,786,972, issued Jan. 22, 1974, to Harley R. Alley. In this embodiment, a pair of hook members at the upper rear wall of the bicycle pack are attached to a bicycle. A vertical resilient member, i.e. a spring, which is positioned by an overlay strap at the rear portion of the bicycle pack, is attached to the central portion of the bicycle pack. The resilient member may be linearly extended to attach at a lower portion of the bicycle adjacent the hub thereof. However, since the rear wall of the bicycle pack is attached adjacent the rear wheel of the bicycle, the patent teaches that a stiffening member, such as a metal plate, is imperative to avoid wrinkles in the rear or back wall of the pack which would interfere with the adjacent bicycle spokes. A smooth pack wall is desirable for both functional and aesthetic purposes.

A similar teaching is to be found in U.S. Pat. No. 3,937,374, issued Feb. 10, 1976, to Edward K. Hine, Jr. While this later patent discloses a more stable arrangement of the resilient member attachment and locating system for the bicycle bag, again it is taught that the bicycle bag must include a rigid stiffening member in the back wall thereof to provide for positive and secure attachment and to maintain the shape of the bag.

Also known are completely pliable bags which are usually attached at the upper portion thereof and secured to the bicycle primarily by the weight of the bag hanging on the upper attachment point. However, as suggested in the above mentioned Alley patent, such bags are prone to wrinkle and, when utilized as a pannier bag, foul the adjacent bicycle spokes.

SUMMARY OF THE INVENTION

The present invention, which affords a heretofore unavailable improvement over previous bicycle packs, comprises a bicycle pack in which a pair of spaced, elongated rigid members secured to the pliable wall of the bicycle pack between the attachment the tensioning means serve to tension the normally pliant fabric into a functionally rigid back wall when attached to a bicycle, thereby lending shape to the pack and avoiding entanglement of the pack with adjacent bicycle moving members as a result of wrinkles in the pack, while permitting the pack to be compressed into a relatively small volume when removed from the bicycle for storage in, for instance, a duffle or conventional luggage.

Accordingly, an object of the present invention is to provide a new and improved structure and method for securing pliable bicycle packs to bicycles.

Another object of the present invention is to provide a new and improved structure and method for bicycle packs which permits the bicycle pack, when removed from the bicycle, to be compressed into a compact, compliant volume suitable for transport in other luggage.

Yet another object of the present invention is to provide a new and improved structure and method for bicycle pannier bags in which the stressed pliant wall of the bag functions as a rigid wall to avoid entanglement with adjacent bicycle spokes when the pannier bag is attached to a bicycle.

These and other objects and features of the present invention will become apparent from the following description.

DETAILED DESCRIPTION OF THE INVENTION

Figure 1:
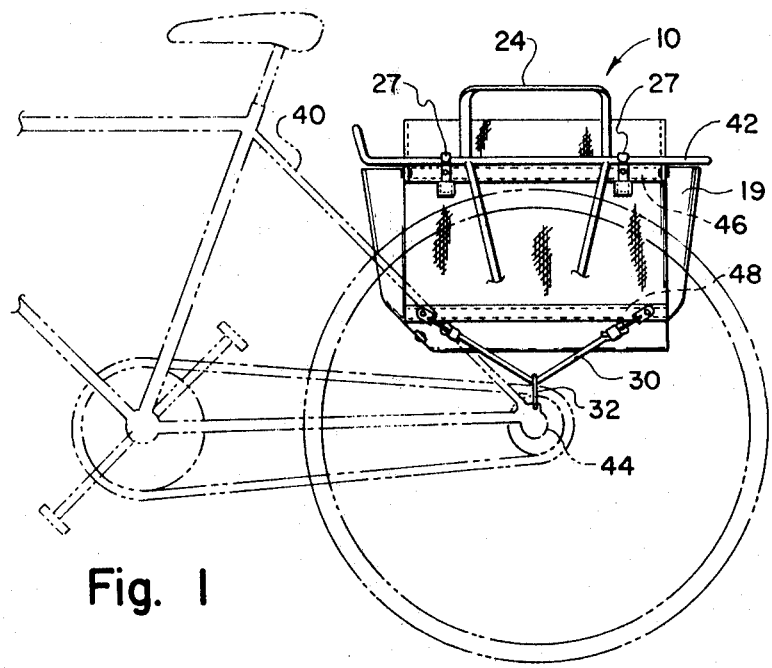
FIG. 1 is an elevation view illustrating a bicycle pack according to the instant invention attached to a bicycle carrier in which the bicycle is represented in ghosted fashion.
Figure 2:
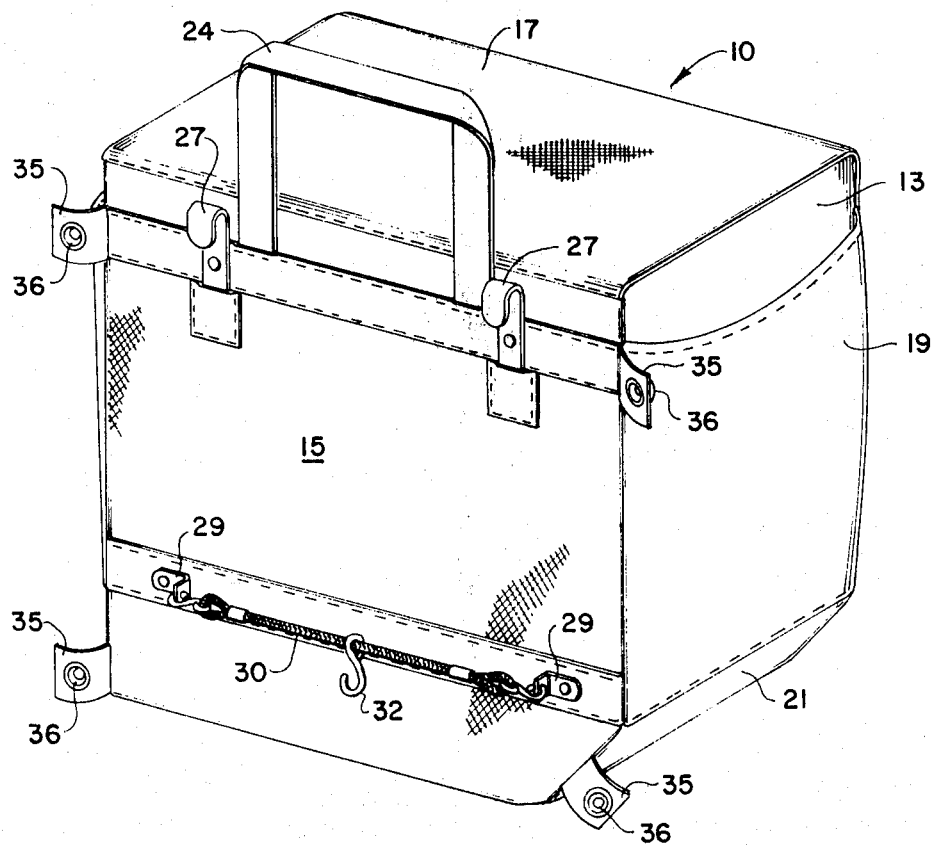
FIG. 2 is a rear, perspective view of a bicycle pack as shown in FIG. 1.
Figure 3:
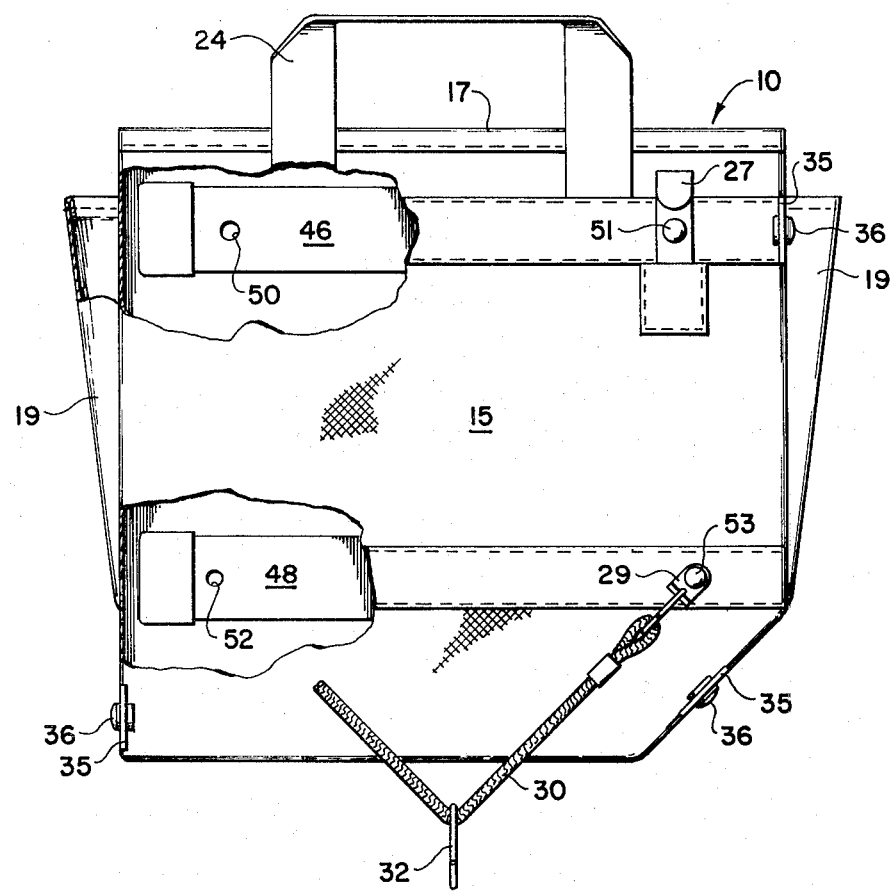
FIG. 3 is a partially cutaway and simplified rear view of the bicycle pack according to the instant invention.

Referring now to the drawings, where like components are designated by like numerals throughout the various figures, a bicycle pack in accord with the present invention as shown in FIGS. 1, 2 and 3, are generally designated by reference numeral 10. Bicycle pack 10 is constructed of a pliable fabric, preferably waterproof or at least water resistant, and of substantial strength. A relatively heavy canvas or coated nylon material are typical examples of such materials. Bicycle bag 10, as illustrated, encloses a main compartment defined in part by side walls 13, back wall 15, and cover 17. The remainder of the main compartment is defined by the bottom wall and front wall (not shown). A pocket 19 may be defined, as illustrated, at at least one end of bicycle bag 10, and, optionally, incline panel 21 may be positioned between side wall 13 and the bottom of bicycle pack 10 to provide heel clearance for a rider while pedaling. For convenience, handle 24 may be attached to bicycle pack 10. In a typical embodiment, attachment hooks 27 are secured to the upper portion of back wall 15, and attachment members 29 are secured to the lower back wall 15 of bicycle pack 10. Resilient member 30 carrying hook member 32, is secured between attachment members 29 to facilitate security pack 10 to a bicycle. Tabs 35, preferably at the corners of back wall 15 of bicycle pack 10, are provided with releasable attachment means, such as snap members 36, in order that a pair of bicycle pack bags may be secured together to form a unitary piece of luggage.

With particular reference to FIG. 1, it will be appreciated that bicycle pack 10 may be positioned on a bicycle 40 by engaging upper attachment hooks 27 to bicycle carrier 42, and securing S-hook member 32 to opening 44 defined in or attached to the frame of bicycle 40 with resilient member 30 in a distended position. The particular mounting system is essentially as described in U.S. Pat. No. 3,937,374 and reference is hereby made to such patent for the details and the advantages of this particular mounting system. However, it is to be understood that a number of mounting systems, including that described in U.S. Pat. No. 3,786,972, may be employed with the instant invention.

As illustrated at FIG. 1, and particularly well at FIG. 3, upper rigid member 46 and lower rigid member 48 are positioned in back wall 15 of bicycle pack 10 adjacent attachment hooks 27 with reference to upper rigid member 46, and adjacent attachment member 29 with reference to lower rigid member 48. Rigid members 46 and 48 are elongated, preferably positioned in a parallel relationship and extend substantially across rear wall 15 of bicycle pack 10, but at least between the attachment points for bicycle pack 10 when a pair of attachment points, as illustrated in the preferred embodiment of the instant invention, are utilized. It will be understood that resilient member 30, when attached to bicycle 40 as shown in FIG. 1, induces a tension between upper rigid member 46 and lower rigid member 48 when bicycle pack 10 is secured to bicycle 40. Accordingly, the forces applied to hooks 27, with respect to upper rigid member 46, and attachment member 29, with respect to lower rigid member 48, are transferred to the associated rigid members. Thus, a tension between upper rigid member 46 and lower rigid member 48 is induced through the fabric of back wall 15 of bicycle pack 10. This presents a smooth, flat shape at functionally rigid back wall 15. However, when the tension in resilient member 30 is released, for instance when bicycle pack 10 is removed from bicycle pack 40, back wall 15 is no longer under tension and accordingly is pliable and suitable for accommodating compression of bicycle pack 10 into a compact shape.

While it is preferred that hooks 27 be securely attached to upper rigid member 46 at opening 50 by means of, for instance, rivet 51, and opening 52 by rivet 53 with regard to attachment members 29 at lower rigid member 48, it is of course feasible to locate rigid members 46 and 48 in pockets formed in bicycle pack 10, and hooks 27 and attachment members 29 for resilient member 30 to the fabric of bicycle pack 10 adjacent such pocket. Other desirable features such as a releasable fastener (not shown) between bicycle 40 and the lower portion of pack 10 may be utilized, but is not critical to the invention.

In summary, it will be recognized that a lightweight bicycle pack in accord with the instant invention utilizes a pair of spaced, rigid members incorporated into the back wall of the pack which, in conjunction with a mounting method utilizing a resilient member to induce tension in the back wall of the pack between the rigid member when mounting the back to a bicycle, to provide a smooth, functionally rigid back wall. On the other hand, when the bicycle pack is removed, the back wall is no longer being under tension, and is readily compressed or distorted for compact storage. The bicycle pack structure, as described herein, is suitable for use with various mounting systems utilizing a resilient member, but a preferred mounting system utilizes a nominally horizontally disposed resilient member which may be distended centrally to secure the pack to, for instance, the rear portion of a bicycle.

While limited embodiments of the present invention have been illustrated and described, it is to be understood that the invention is operable with a number of pack configurations, and it is anticipated that various changes in modification will be apparent to those skilled in the art with such changes being made without departing from the scope of the invention as defined by the following claims.

We claim:
1. A pannier bag comprising:
   a bag structure having a rear wall of pliable material;
   upper attachment means adapted to be operably connected to a bicycle structure the upper attachment means being positioned at the upper portion of the rear wall of the bag structure;
   lower attachment means adapted to be operably connected to a bicycle structure, the lower attachment means being positioned at the lower portion of the rear wall of the bag structure;
   tension means to induce a tension in the rear wall of the bag structure between the upper attachment means and the lower attachment means, and further being adapted to operably connect one of the upper attachment means and lower attachment means to the bicycle structure;
   upper rigid means positioned adjacent the upper attachment means and extending transversely across the rear wall of the pannier bag; and
   lower rigid means positioned adjacent the lower attachment means and extending transversely across the rear wall of the pannier bag;
   whereby the tension means, when the pannier bag is attached to the bicycle structure, induces an even tension between the upper and lower rigid means thereby tensioning the portion of the rear wall of the pannier bag therebetween to a flat, functionally rigid wall structure.

2. A pannier bag as set forth in claim 1 in which the upper attachment means comprise a pair of downwardly facing hook members adapted to engage the carrier frame of a bicycle.

3. A pannier bag as set forth in claim 1 in which the lower attachment means and tensioning means comprise a pair of transversely spaced attachment points at the rear wall of the pannier bag and a resilient member secured to the attachment points at the end portions thereof and adapted to be secured under tension to a bicycle structure.

4. A pannier bag as set forth in claim 3 in which the resilient member comprises a resilient cord having an S-hook attached thereto, with the S-hook being adapted to connect to a bicycle structure.

5. A pannier bag as set forth in claim 1 in which the upper and lower rigid means comprise elongated rigid members extending transversely across the rear portion of the pannier bag in a spaced, parallel relationship.

6. A pannier bag as set forth in claim 5 in which the elongated rigid members are secured to the back wall adjacent the upper and lower attachment points, respectively.

7. A pannier bag as set forth in claim 5 in which the upper and lower elongated rigid members are attached to the upper and lower attachment points, respectively.

8. A pannier bag comprising:
   a bag structure of pliable material having an opening defined in the upper portion thereof, and a rear wall of a substantially planar configuration;
   a pair of downwardly facing hook members transversely spaced and attached at the upper portion of the rear wall of the bag structure;
   a pair of transversely spaced attachment points positioned at the lower portion of the rear wall of the pannier bag;
   a resilient member extending between the attachment points and adapted to be secured to a bicycle structure to induce tension between the hook members and the attachment points;

a first elongated member extending transversely across the rear wall of the pannier bag adjacent the hook members and operably connected thereto; and a lower elongated member extending transversely across the rear wall of the pannier bag adjacent the attachment points and operably connected thereto;

whereby the resilient member may be attached under tension to a lower portion of a bicycle structure, the hook members attached to the upper portion of a bicycle structure and tension induced between the two elongated members through the rear wall to effectively induce a flat, functionally rigid rear wall.

9. A method of attaching a pannier bag having a pliable rear wall to a bicycle structure, comprising:

securing upper attachment means positioned at the upper portion of the rear wall to the bicycle structure;

securing lower attachment means positioned at the lower portion of the rear wall to the bicycle structure at a position spaced from and below that to which the upper attachment means is secured;

inducing tension between the upper and lower attachment means by interposing a resilient member between the bicycle structure and one of the upper and lower attachment means;

transferring the tension from the upper and lower attachment means to an upper elongated member and a lower elongated member substantially parallel to the upper elongated member, the upper elongated member and the lower elongated member being adjacent the upper and lower attachment means, respectively; and tensioning the rear wall between the upper and lower elongated members to form a substantially flat, functionally rigid wall of the pliable material.

10. A method of attaching a pannier bag as set forth in claim 9 in which the upper elongated member is secured to the upper attachment means and the lower elongated member is secured to the lower attachment means.

11. A method of attaching a pannier bag as set forth in claim 9 in which the upper elongated member and upper attachment means are independently attached to the pliable rear wall adjacent each other, and the lower elongated member and lower attachment means are independently attached to the pliable rear wall adjacent each other.

* * * * *

UNITED STATES PATENT AND TRADEMARK OFFICE
CERTIFICATE OF CORRECTION

PATENT NO. : 4,262,829
DATED : April 21, 1981
INVENTOR(S) : Hine et al

It is certified that error appears in the above-identified patent and that said Letters Patent are hereby corrected as shown below:

Claim 9, Column 6, Line 12, after "rigid" insert -- rear --.

Signed and Sealed this

Eighteenth Day of August 1981

[SEAL]

Attest:

Attesting Officer

GERALD J. MOSSINGHOFF

Commissioner of Patents and Trademarks